US012439122B2

(12) United States Patent
Ramaswamy

(10) Patent No.: US 12,439,122 B2
(45) Date of Patent: Oct. 7, 2025

(54) SYSTEMS AND METHODS FOR CONTENT ITEM INSERTION

(71) Applicant: Comcast Cable Communications, LLC, Philadelphia, PA (US)

(72) Inventor: Srinath V. Ramaswamy, East Windsor, NJ (US)

(73) Assignee: Comcast Cable Communications, LLC, Philadelphia, PA (US)

(*) Notice: Subject to any disclaimer, the term of this patent is extended or adjusted under 35 U.S.C. 154(b) by 121 days.

(21) Appl. No.: 17/579,109

(22) Filed: Jan. 19, 2022

(65) Prior Publication Data

US 2023/0232074 A1  Jul. 20, 2023

(51) Int. Cl.
*H04N 21/81* (2011.01)
*H04N 21/433* (2011.01)
*H04N 21/4545* (2011.01)
*H04N 21/472* (2011.01)

(52) U.S. Cl.
CPC ... *H04N 21/45457* (2013.01); *H04N 21/4331* (2013.01); *H04N 21/472* (2013.01); *H04N 21/812* (2013.01)

(58) Field of Classification Search
CPC .................................................. H04N 21/812
See application file for complete search history.

(56) References Cited

U.S. PATENT DOCUMENTS

| 8,571,935 | B2 | 10/2013 | Geer, III et al. |
| 8,898,715 | B2 | 11/2014 | Sansom et al. |
| 9,009,066 | B2 | 4/2015 | Long et al. |
| 9,154,824 | B2 | 10/2015 | Wiser et al. |
| 9,503,691 | B2 | 11/2016 | Lawrence-Apfelbaum et al. |
| 9,990,655 | B2 | 6/2018 | MacTiernan et al. |
| 2004/0103429 | A1* | 5/2004 | Carlucci .......... H04N 21/44016 348/E5.002 |
| 2005/0281328 | A1* | 12/2005 | Hurst ............... H04N 21/44016 375/240 |
| 2014/0150019 | A1* | 5/2014 | Ma ....................... H04N 21/458 725/34 |
| 2015/0074732 | A1* | 3/2015 | Green .................. H04N 21/812 725/93 |
| 2017/0188115 | A1* | 6/2017 | Bafekr ................. H04N 21/812 |
| 2018/0160195 | A1* | 6/2018 | Redmond .......... G06Q 30/0251 |
| 2022/0086532 | A1* | 3/2022 | Major ................ H04N 21/4882 |

OTHER PUBLICATIONS

Ramaswamy, Srinath V. "Targeted Advertising in Linear Television", © 2018 SCTE•ISBE and NCTA.

* cited by examiner

*Primary Examiner* — Michael H Hong

(74) *Attorney, Agent, or Firm* — Banner & Witcoff, Ltd.

(57) ABSTRACT

Systems, apparatuses, and methods are described for users to cause replacement of one or more advertisements or other content items. Based on a request to replace a content item, output of the content item may be interrupted. An alternate content item may be output during a time period when a portion of the interrupted content item was scheduled to be output.

35 Claims, 9 Drawing Sheets

| Content ID | Replaceable? | Start Time | End Time | Duration |
|---|---|---|---|---|
| 0023 | Yes | T1= 08:00:00 | T2=08:02:30 | 140s |
| 0024 | Yes | T2=08:02:30 | T3=08:03:00 | 30s |
| 0025 | No | T3=08:03:00 | T4=08:04:00 | 60s |
| 0026 | Yes | T4=08:04:00 | T5=08:05:00 | 60s |

FIG. 7

SYSTEMS AND METHODS FOR CONTENT ITEM INSERTION

BACKGROUND

During a live sports event or other types of content that is sent to multiple users in real-time, advertisements may be inserted into an insertion slot (e.g., associated with a timeout or other break-in action of the sports event). A user who is not interested in an advertisement inserted into the time slot may change channels. However, by changing the channel, the user may miss part of the sports event or other content that resumes when the advertisement time slot ends. Moreover, advertising revenue may be lost because of the user changing channels.

SUMMARY

The following summary presents a simplified summary of certain features. The summary is not an extensive overview and is not intended to identify key or critical elements.

Systems, apparatuses, and methods are described for providing individual users the ability to replace initially-scheduled content items that are output in connection with a linear content item and/or in connection with another type of content item. One or more alternate content items may be selected after receiving, from a user, an indication to replace the initially-scheduled content item. The selected one or more alternate content items may be output during a time period when a portion of the initially-scheduled content item was scheduled to be output. The one or more alternate content items may be selected from a plurality of content items, at least two of which have different time durations. The selection may be based on the time duration of each of the plurality of content items, as well as one or more determined times. The one or more determined times may include the time when the linear content item, following the initially-scheduled content item to be replaced, is scheduled to be started or resumed. This may be helpful because the user who is not interested in the initially-scheduled content item being output may view alternate content items without the need to switch channels and therefore without missing the beginning of the following linear content item.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 7 shows an example of information included in data messages.

DETAILED DESCRIPTION

Figure 1:
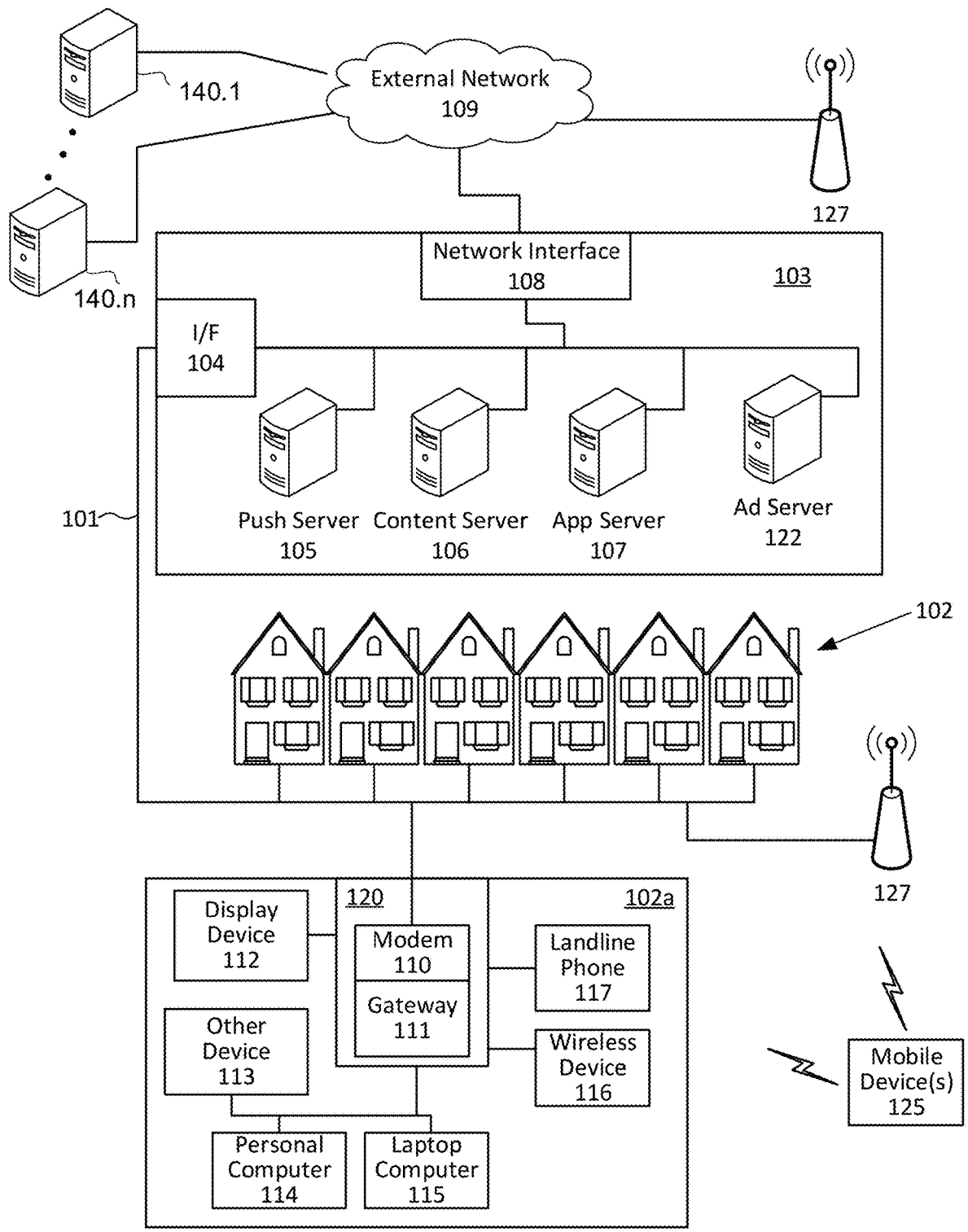
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122 and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. The ad server 122 may store advertisements to be formatted and inserted in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, the ad server 122, and/or other server(s) may be combined and/or server operations described herein may be distributed among servers or other devices in ways other than as indicated by examples included herein. Also or alternatively, one or more servers 140.1-140.n may be part of the external network 109 and may be configured to communicate (e.g., via the local office 103) with other computing devices (e.g., computing devices located in or otherwise associated with one or more premises 102). Any of the servers 105-107, and/or 122, and/or other servers described herein (e.g., one or more of the servers described below in connection with FIG. 3) may also or alternatively be implemented as one or more of the servers 140.1-140.n. The servers 105, 106, 107, 122, 140.1-140.n, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
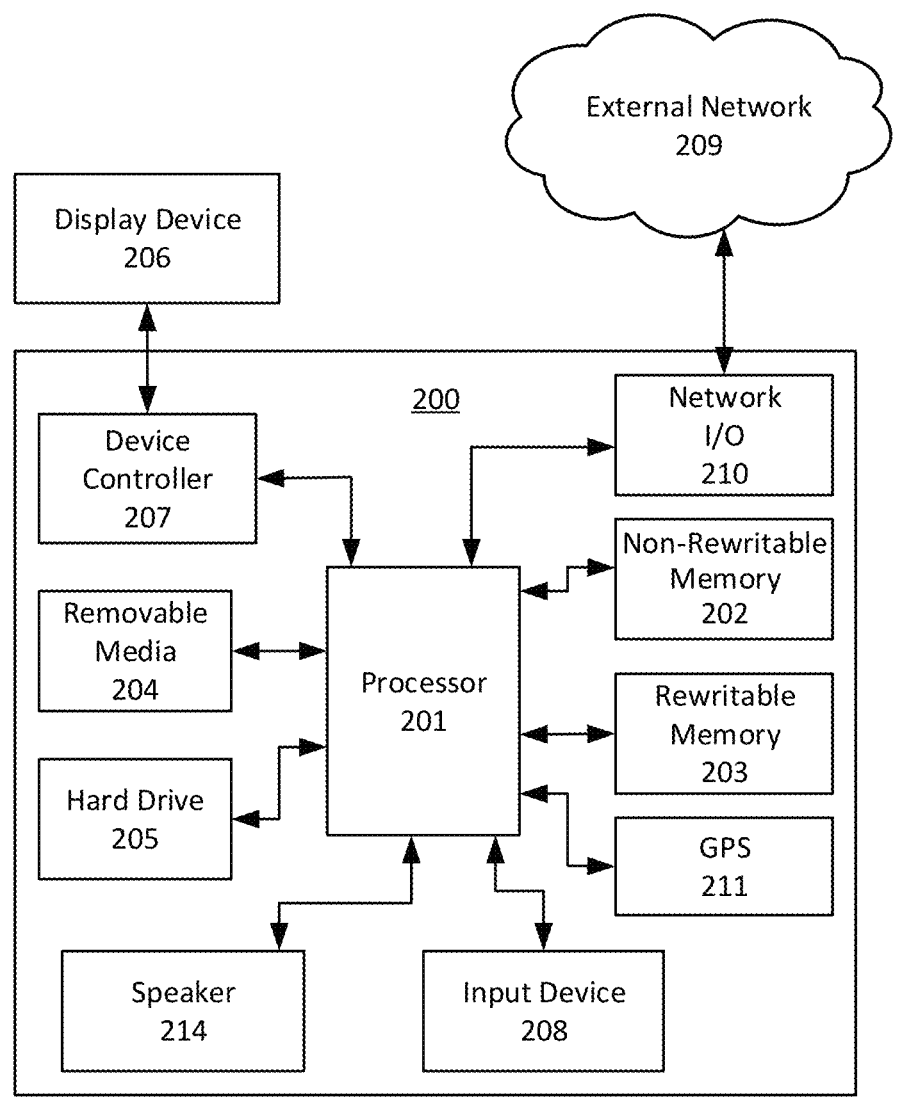
FIG. 2 shows hardware elements of a computing device.
Figure 3:
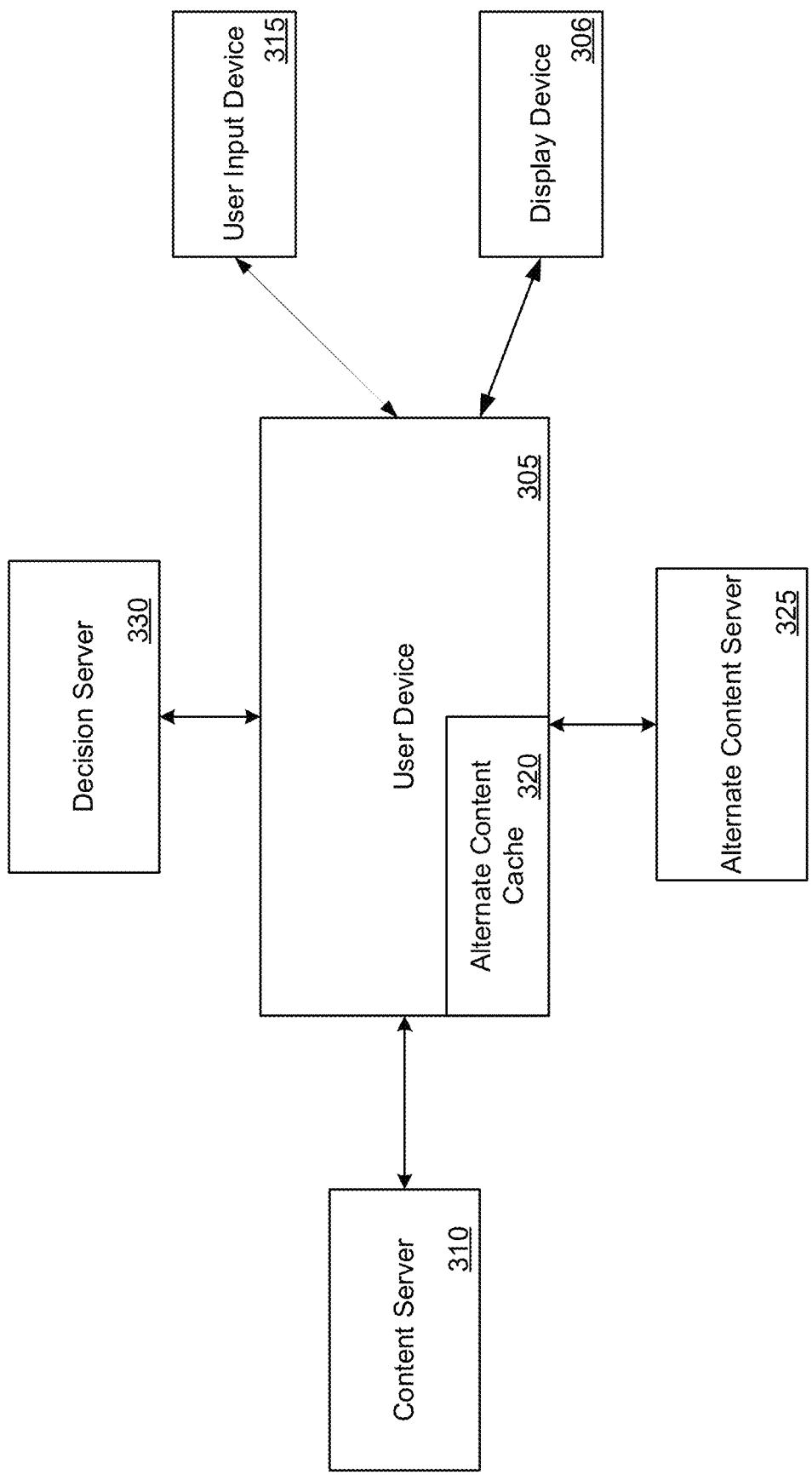
FIG. 3 shows an example of computing devices communicating via a network.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109), any of the computing devices shown in FIG. 3 (e.g., user device 305, content server 310, user input device 315, alternate content cache 320, alternate content server 325, and decision server 330), and/or any other computing devices discussed herein. The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on the execution of programming instructions read from ROM or RAM, with other operations hardwired into gates or other logic. Further, an IC may be configured to output image data to a display buffer.

FIG. 3 shows an example of computing devices configured to communicate via one or more networks. User device 305 may be configured to cause the output of content items (e.g., video and/or audio) via a display device 306. The user device 305 may be a device located in premises 102a. For example, the user device 305 may comprise a gateway 111, other devices 113, personal computer 114, laptop computer 115, a wireless device 116, or mobile device 125 as shown in FIG. 1, and/or any other computing device. The display device 306 may be configured to display content items to a user for viewing. The display device 306 may receive signals associated with content items and/or instructions from the user device 305. The display device 306 may be a separate physical device (e.g., a TV) communicating with the user device 305 or may be integrated into user device 305 (e.g., a display screen of a tablet or other computing device).

The user device 305 may receive data streams associated with one or more content items from the content server 310. The content server 310 may be a content server 106 as shown in FIG. 1, and/or may be a remote server communicating with the user device 305 via external network 109.

The content server 310 may send linear and/or non-linear content items to the user device 305 (e.g., via one or more networks) and/or to other user devices. Linear content items may comprise content items for which the user has limited ability to shift the output time (e.g., the user may not be able to fast forward a linear content item). For example, a linear content item may comprise audio and/or video of a sports event that is broadcast in real-time. The user may not be able to fast-forward a real-time sports event because data associated with the live sports event in a future time has not yet been generated. As another example, a linear content item may comprise audio and/or video of an online conference in which a user may participate with other users and interact with other uses in real-time. As yet another example, a linear content item may comprise audio and/or video of a video game having multiple players interacting with each other. A linear content item may also or alternatively comprise one or more other types of content for which the user's ability to shift the output time is not allowed for various reasons (e.g., a movie or other content that is being broadcast but which is not recorded locally and/or is unavailable on-demand). Non-linear content items may comprise content items for which a user may have the ability to control the output time (e.g., a video-on-demand program that allows the user to fast forward, pause or resume as the user wishes).

The content server 310 may output content (e.g., a stream of data for audio and/or video associated with the output content) that comprises insertion slots configured for insertion of other content items. Such inserted/insertable content items may comprise advertisements, announcements, and/or any other type of content. The insertion slots may be located between different linear and/or non-linear content items, between portions of a linear and/or non-linear content item, before a linear and/or non-linear content item, and/or after a linear and/or non-linear content item. For example, an insertion slot may divide a linear content item into a first portion and a second portion. The output of the first portion of the linear content item may be ended at the beginning of the insertion slot and the second portion of the linear content item may be started (also referred to as "resumed" below) at the end of the insertion slot. For example, a linear content item may be a live sports event. An insertion slot may correspond to the time of an expected timeout of that sports event, and other content items (e.g., one or more advertisements) may be inserted into the insertion slot. As discussed in greater detail below, the inserted content items in the insertion slot, and/or content items initially scheduled for insertion in the insertion slot, may be replaced by the user device 305 under certain circumstances. However, the beginning and/or ending of the insertion slot may not be allowed to be changed by the user device 305, so that the user may not miss a portion of the linear content item that the user does not want to miss.

The content server 310, and/or any other server, may send one or more data messages to the user device 305 to indicate the insertion slots. The data messages may comprise information (e.g., the beginning time, the ending time, the time duration of the insertion slot) associated with the insertion slot. The data messages may also indicate the number of content items to be inserted into the insertion slots. Some data messages may comprise attribute parameters (e.g., name, address, start time, end time, time duration) associated with individual content items to be inserted into the insertion slot. For each content item to be inserted, one or more data messages may also comprise an indication indicating whether the content item is replaceable or not.

An alternate content insertion decision server 330 (hereinafter "decision server 330") may be configured to receive and/or process the data messages. In the example of FIG. 3, the decision server 330 is shown as a separate device that may communicate with the user device 305 via a network.

For example, if the user device 305 receives an indication to replace at least a portion of a content item currently being output via the display device 306, the user device 305 may send the indication to the decision server 330. If the decision server 330 generates instructions, for the user device 305, to interrupt the output of current content item, to obtain alternate content items, and/or to perform any other operations as described below, the decision server 330 may send, via the network and to the user device 305, the instructions. However, operations of the decision server 330 may also or alternatively be performed by the user device 305 (e.g., by a software and/or hardware module executing on the user device 305), the content server 310, the alternate content server 325 or any other devices that communicate with the user device 305. The decision server 330 may generate the instructions based on the data messages and/or the indication to replace at least a portion of the content item. For example, as may be discussed in greater detail below, if a data message indicates a content item is replaceable, the decision server 330 may obtain, or instruct the user device 305 to obtain, a plurality of content items as candidate content items to replace that content item under certain circumstances. The plurality of content items may be obtained from the alternate content server 325. The alternate content server 325 may be the ad server 122 as shown in FIG. 1, and/or any other servers (e.g., a server communicating with the user device via the external network 109). The instructions may comprise information identifying a time when the output of the current content item is to be interrupted, and/or information identifying the alternate content item.

Audio and/or video data associated with the plurality of content items may be stored to an alternate content cache 320. Although the alternate content cache 320 is shown in FIG. 3 as a storage location incorporated into the user device 305, the alternate content cache 320 may be located at any other devices shown in FIG. 3, or at an independent device not shown in FIG. 3. The alternate content cache 320 may communicate with the user device 305. Also or alternatively, data stored at the alternate content cache 320 may comprise uniform resource locators (URLs), storage location addresses, pointers, or other data that may be used to retrieve audio and/or video data for the content items.

A user input device 315 may be configured to send user inputs to the user device 305. The user input may be received via the user input device 315 from a user viewing content items via the display device 306 associated with the user device 305. For example, the user input device 315 may be a remote controller, a keyboard, a microphone configured to receive the user's voice commands, a camera configured to receive the user's gesture commands, a touch screen, and/or any other input device. Also or alternatively, the user input device may be integrated into the user device 305 and/or the display device 306 (e.g., a portion of a touch screen being used to output content). If the user is not interested in a content item currently being displayed during the insertion slot, the user may send, via the user input device 315, an indication to replace the current content item being output. The decision server 330 may process the indication and generate instructions in terms of whether and/or when to replace the current content item with one or more alternate content items, as may be described below. The content items scheduled for an insertion slot, and/or alternate content items, may be advertisements, and also/alternatively, may comprise other types of content (e.g., emergency notifications, public service announcements, game highlights (e.g., scores of other games if the slot is between parts of linear content comprising a sporting event), etc.)

Figure 4A:
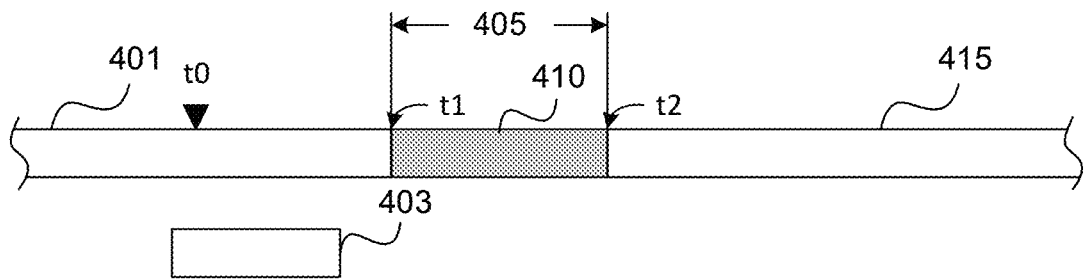
FIGS. 4A-4B show examples of a content item data stream.
Figure 4B:
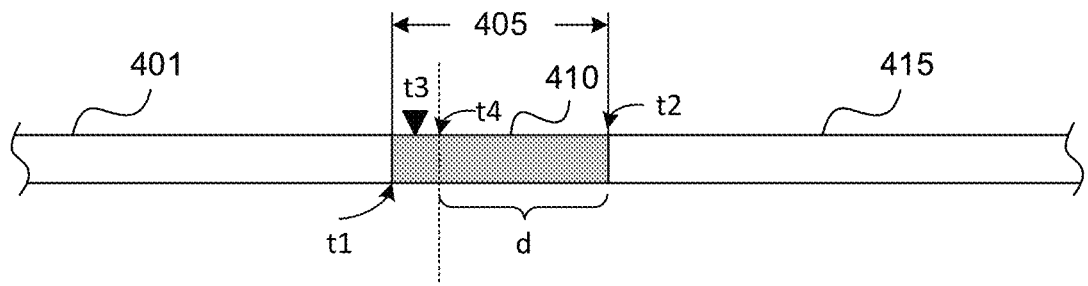
Figure 4C:
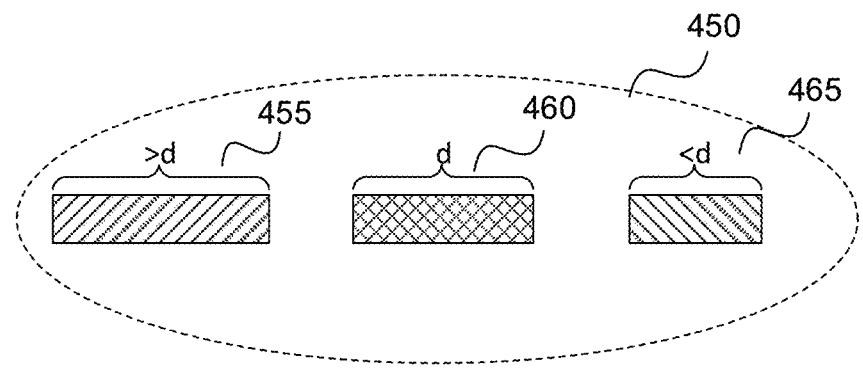
FIG. 4C shows a plurality of example content items.
Figure 4D:
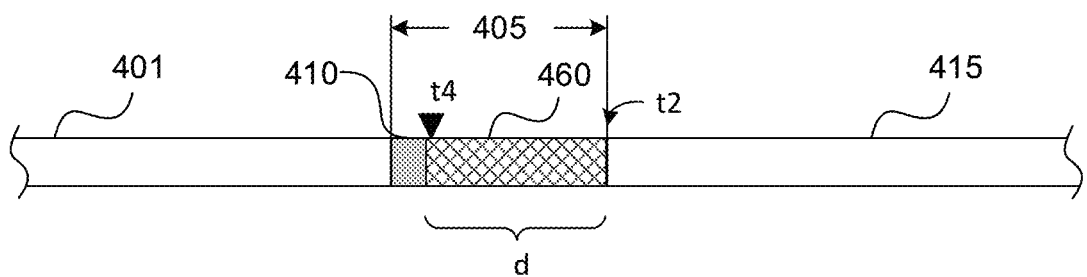
FIG. 4D shows another example of a content item data stream.

FIGS. 4A, 4B, and 4D show examples of a data stream that may be received (e.g., by the user device 305 from the content server 310). For convenience, FIGS. 4A, 4B, and 4D are described by way of an example in which the steps are performed by the user device 305. Also or alternatively, one, some, or all steps of the example method of FIGS. 4A, 4B, and 4D, or portions thereof, may be performed by one or more other computing devices (e.g., any of the computing devices shown in FIGS. 1-3, the decision server 330, alternate content server 325, or content server 310). The data stream may be associated with content items that may be output (e.g., via the display device 306). FIGS. 4A, 4B, and 4D show content items associated with the data stream being output (and/or scheduled to be output) over time. A current time (e.g., time t0 shown in FIG. 4A, time t3 shown in FIG. 4B, and time t4 shown in FIG. 4D) is shown in each of the FIGS. 4A, 4B, and 4D, and a reversed triangle shape associated with the current time in the respective figure points out a certain portion of a content item currently being output via the display device 306. Time and the playback of the data stream flow from the left to the right in FIGS. 4A, 4B, and 4D.

Figure 4E:
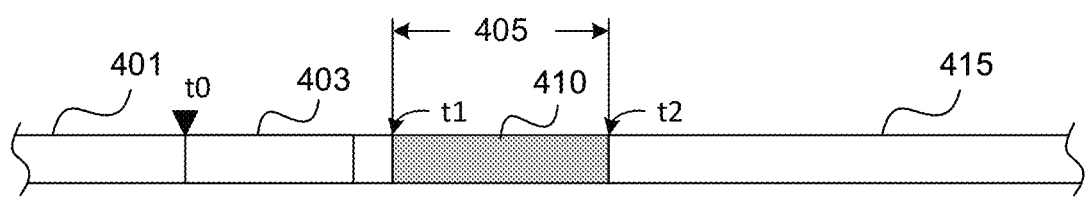
FIG. 4E shows another example of a content item data stream.

Referring to FIG. 4A, the data stream comprises content item 401 and content item 415. For example, content items 401 and 415 may be linear content items or nonlinear content items. The content item 401 and the content item 415 may be one content item divided into two parts by an insertion slot 405 (e.g., the content items 401 and 415 may be portions of one live sports event divided by a timeout) or may be two unrelated content items (e.g., two different TV shows) with the insertion slot 405 in between. The insertion slot 405 may be scheduled to begin at time t1 and end at time t2. The content item 401 and content item 415 may be received by the user device 305 and output via a display device 406 during the scheduled time, absent user instruction otherwise. A content item 410 (e.g., an advertisement) may be initially scheduled for output during the insertion slot 405 absent a user instruction otherwise. The content item 410 may be linear or non-linear. The user device 305 may decode the data stream and/or process the data stream into a format suitable to be output via the display device 306. For example, at time t0, the display device 306 may be outputting a data frame associated with the liner content item 401. One or more data messages 403 associated with the insertion slot 405 may be received (e.g., at or around time t0) by the user device 305. The one or more data messages 403 may, for example, comprise one or more modified SCTE 35 messages (e.g., as described below in connection with table 1 and table 2) and/or may indicate a content item 410 is scheduled to be inserted into the insertion slot 405. The one or more data messages 403 may also indicate the content item 410 is replaceable. The one or more data messages 403 is shown in FIG. 4A separately from the data stream associated with content items 401, 410, and 415, but may be implemented as a part of the data stream (e.g., as separate packets and/or as part of packets containing audio and/or video data for the content item 401). For example, FIG. 4E shows an alternate example of FIG. 4A, where the one or more data message 403 is implemented as a part of the data stream. Referring to FIG. 4B, at time t3 (between time t1 and time t2), the output of the content item 410 via the display device 306 may have begun, and an indication to replace the content item 410 may be received. For example, the user viewing the content item 410 may not be interested in the content item 410 and therefore may send the indication via the user input device 315. After the indication is received, the user device 305 may determine (e.g., based on the one or more data messages 403) the time t2 when the output of the content item 415 is to begin.

The user device 305 may also determine a time t4 when the output of the content item 410 is to be interrupted. For example, time t4 may be determined based on a proper exit frame associated with the content item 410 (e.g., the time t4 may be a time associated with output of the exit frame). The exit frame may be a data frame that is, in decode order, preceding an intra-coded picture ("I-frame"), an Instantaneous Decoder Refresh frame ("IDR frame"), or a predicted picture frame ("P frame"). The user device 305 may stop decoding data frames of the content item 410 after having decoded the exit frame. The user device 305 may cause the output of all the decoded data frames of the content item 410 and start to cause the output of the first frame of the next content item. Interrupting the output of a current content item at a proper exit frame proceeding an I-frame, an IDR frame, or P frame, as opposed to a bidirectional predicted picture frame ("B-frame") may improve the user's experience, because it may allow all the data frames, in display order, preceding the exit frames to be decoded. In this way, the user may experience fewer audio/video artifacts during the switching from the initially-scheduled content item to the alternate content item. Also or alternatively, time t4 may also be determined based on the time when an impression credit of the content item 410 is to be awarded. For example, the content item 410 may be awarded an impression credit if a predetermined portion of the content item 410 has been output (e.g., if the content item 410 is output for at least 1 minute or for some other predetermined amount of time). At time t3, the content item 410 may have only been output for 40 seconds. A determination may be made to interrupt the output of the content item 410 20 seconds later.

An alternate content item may be selected to be output to replace the content item 410. The selection may be based on at least one of time t4 or time t2. For example, a time duration d between time t4 and t2 may be determined. FIG. 4C shows a plurality of content items 450 that may be determined as candidates to replace the content item 410 (or a portion thereof). The plurality of content items 450 may, for example, be stored in the alternate content cache 320 as described in FIG. 3. At least two of the plurality of content items 450 may have different time durations. For example, a first content item 455 may have a duration that is longer than duration d. A second content item 460 may have a duration that is equal to duration d. A third content item 465 may have a duration that is shorter than duration d. Based on the different time durations, the second content item 460 may be selected as the alternate content item to replace a portion of the current content item 410.

Each of the plurality of content items 450 may be unrelated content items (e.g., different advertisements), or some of the plurality of content items 450 may be related content items (e.g., different versions of a same advertisement, each version having a different time duration).

The three content items 455, 460, and 465 are merely examples, and other numbers of content items, and/or content items having other durations are possible. For example, the time duration of each content item of the plurality of content items 450 may be either longer or shorter than the duration d, and a content item having a precise duration equal to d may not be included in the plurality of content items 450. In such situations, the alternate content item may be selected based on additional criteria. For example, the content item whose duration is closest to the duration d may be selected. Besides time duration, other parameters may also be given weight. For example, the preference of users, the relatedness of the alternate content item with either the content item 401 or content item 415, and/or other policies may be weighted during the selection.

Referring to FIG. 4D and consistent with the example where the content item 460 is selected as the alternate content item, the output of the content item 410 may be interrupted at time t4 and the content item 460 may be output during time t4 to time t2. For example, the portion of the content item 410 that was scheduled to be output during time t4 to time t2 may be replaced with data associated with the content item 460. The user device 305 may receive one or more frames associated with content item 460 prior to time t4. The user device 305 may determine a first data frame associated with content item 410 that is scheduled to be started at time t4 (e.g., when all the decoded data frames are expected to have been output), and determine a second data frame associated with content item 460 that is scheduled to be started at time t4 (e.g., the first data frame associated with content item 460). The user device 305 may cause the output of a data frame associated with content item 410 that is immediately preceding the exit frame, and cause the output of one or more data frames associated with content item 460 starting with the second data frame. At time t2, the output of the content item 415 may begin. If the content item 460 ends at time t4, the first data frame associated with content item 415 may be output after the last data frame of content item 460 ends.

If an alternate content item selected does not have an equal time duration as the time period between time t4 to time t2 (e.g., if the plurality of content items 450 does not include the content item 460), the user device 305 may operate based on the time duration of an available alternate content item. For example, if an available alternate content item has a longer time duration (e.g., the alternate content item does not end on time t2), an exit frame of the alternate content item may be determined in a way similar to the determination of the exit frame of the initially-scheduled content item 410 as discussed above, and the output of the alternate content item may be ended after all the decoded data frames of the initially-scheduled content item 410 have been output. If the alternate content item has a shorter time duration, other content such as a still picture may be output until time t2.

FIGS. 4A to 4E are merely examples. It is appreciated that other variations may be possible. An insertion slot 405 may be inserted with multiple replaceable content items, which may be discussed in further detail below.

Figure 5A:
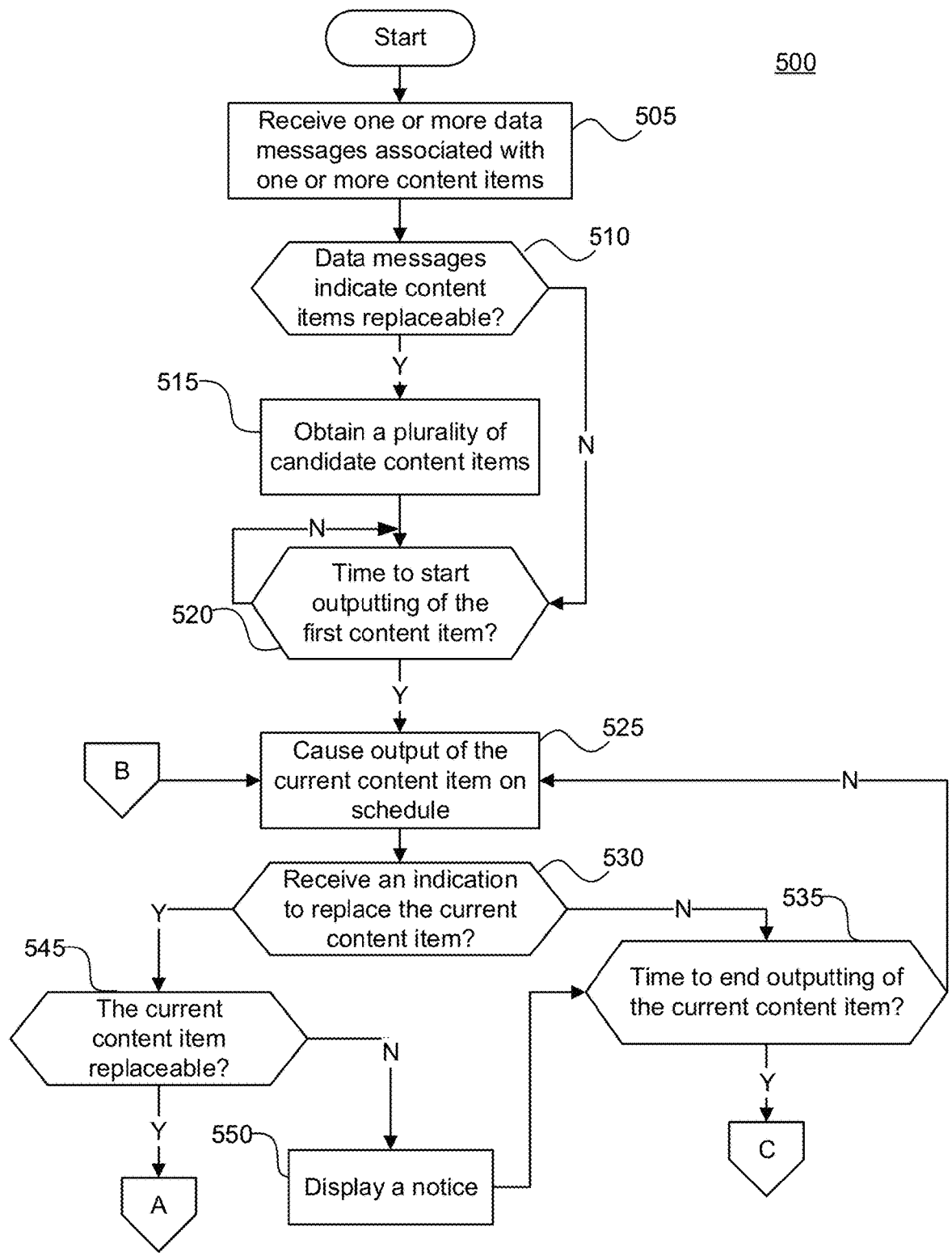
FIGS. 5A and 5B are a flow chart showing steps of an example method associated with replacing content items.
Figure 5B:
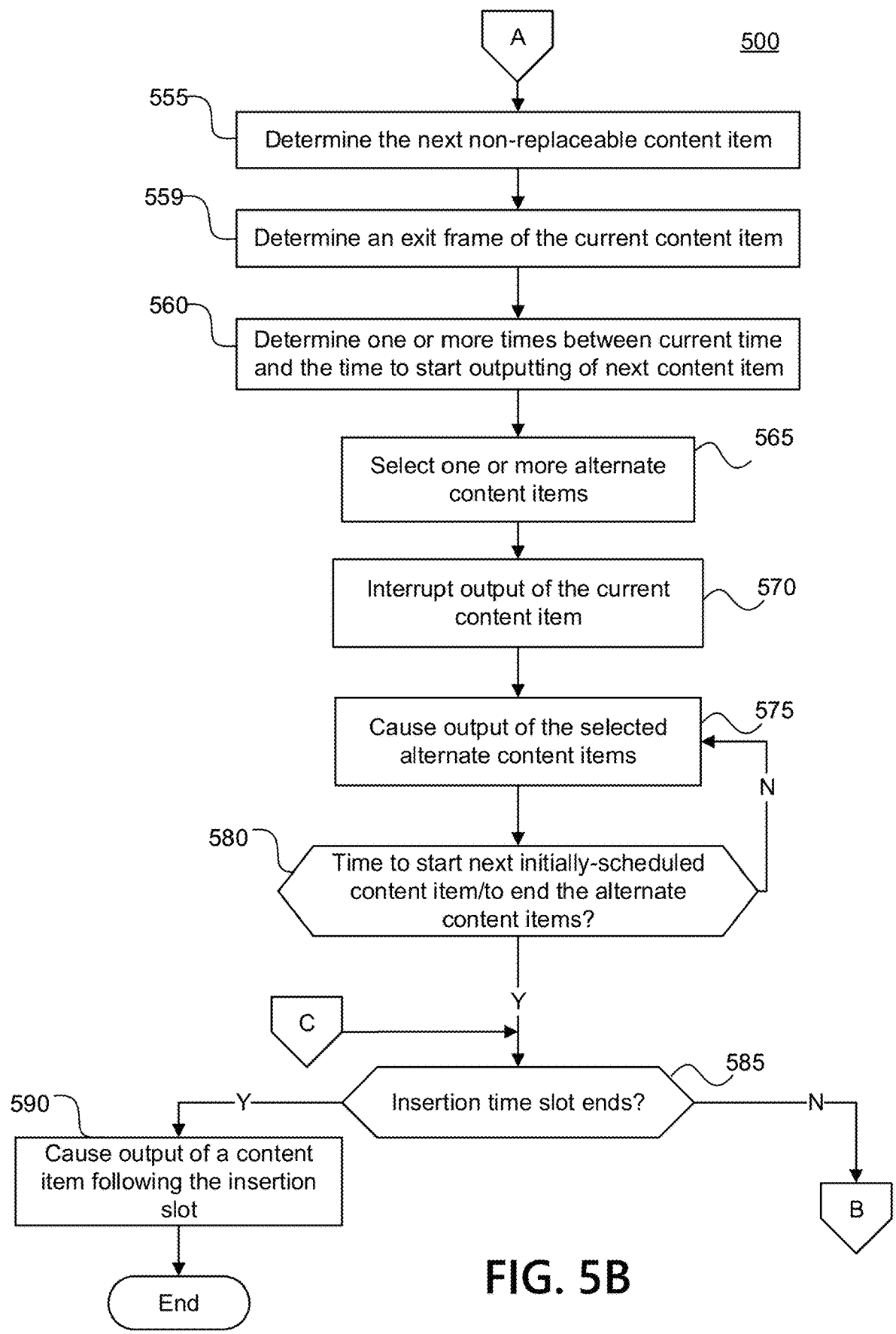

FIGS. 5A and 5B are a flow chart showing steps of an example method associated with replacing content items. For convenience, FIGS. 5A-5B is described by way of an example in which the steps are performed by the user device 305. Also or alternatively, one, some, or all steps of the example method of FIGS. 5A to 5B, or portions thereof, may be performed by one or more other computing devices (e.g., any of the computing devices shown in FIGS. 1-3, the decision server 330, alternate content server 325, or content server 310). One, some, or all steps of the example method of FIGS. 5A to 5B may be performed in connection with determining whether to replace content items in insertion slots associated with the output of content items (e.g., linear content items), such as in the example of FIGS. 4A-4D and/or the example of FIGS. 6 to 7 (described below). Also or alternatively, one, some, or all steps of the example method of FIGS. 5A to 5B may be performed in connection with determining whether to replace content items in insertion slots associated with the output of non-linear content items, and/or a combination of linear and non-linear content items. One, some, or all steps of the example method of FIGS. 5A to 5B may be omitted, performed in other orders, and/or otherwise modified, and/or one or more additional steps may be added.

Figure 6:
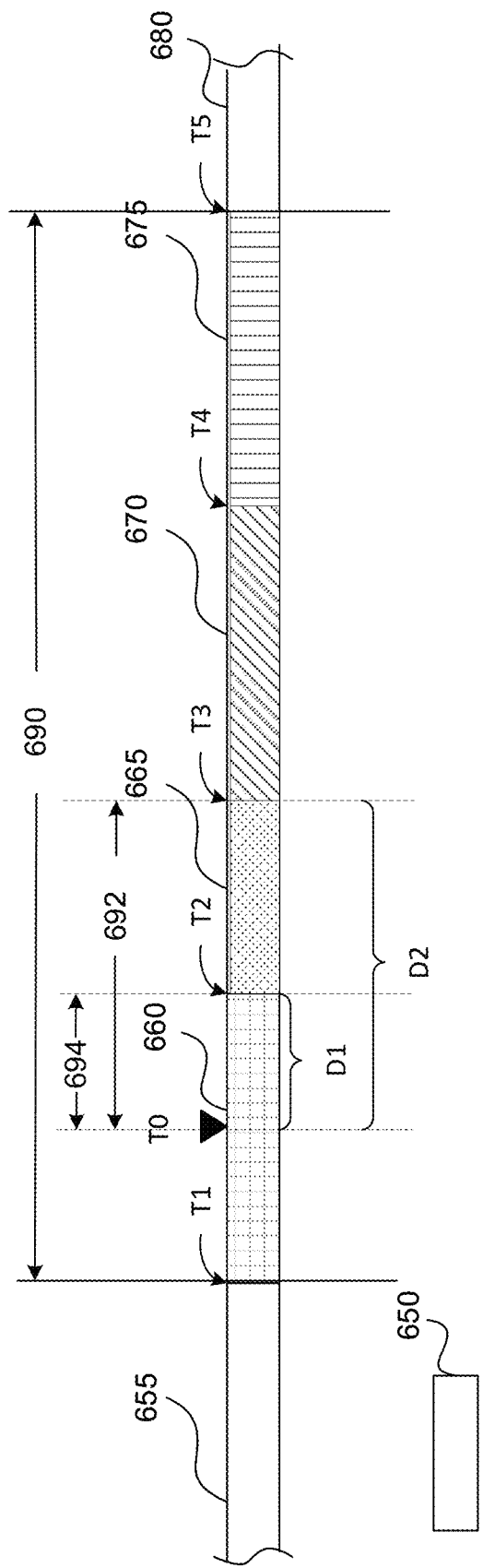
FIG. 6 shows another example of a content item data stream.

Referring to FIG. 5A, in step 505, the user device 305 may receive one or more data messages (e.g. such as the data message 403 of FIG. 4A, or the data message 650 of FIG. 6, described below). The one or more data messages may be received during the output of a linear content item. The one or more data messages may be associated with an insertion slot (e.g., the insertion slot 405 between time t1 to time t2 as shown in FIG. 4A and/or the insertion slot 690 between time T1 to time T5 as shown in FIG. 6 below). The one or more data messages may comprise information associated with one or more content items scheduled (and/or otherwise planned) to be inserted during the insertion slot. For example, one or more data messages may comprise information associated with a first content item inserted into the insertion slot. The one or more data messages may comprise a first timestamp corresponding to a time when the first content item is scheduled to start, a second timestamp corresponding to a time when the first content item is scheduled to end, and/or a time duration of the first content item. The one or more first data messages may also comprise an indication regarding whether the first content item is replaceable.

FIG. 6 shows a data stream associated with a plurality of content items planned to be output. Time flow and playback of the data stream are from the left to the right. Content items (e.g., linear content) 655 and 680 may be one content item divided into two parts by an insertion slot 690 or may be two unrelated content items with the insertion slot 690 in between. The insertion slot 690 may be between time T1 and time T5. One or more content items (e.g., content items 660, 665, 670, and 675) may be scheduled to be inserted into the insertion slot 690 absent a user command that indicates otherwise (e.g., to replace one or more of the content items). The data stream of FIG. 6 may be similar to the data stream of FIGS. 4A, 4B, and 4D, but four content items are scheduled to be inserted in FIG. 6 instead of just one. One or more data messages 650 may be received. The one or more data messages 650 may be similar to the one or more data messages 403 of FIG. 4A. FIG. 7 shows an example of information that may be included in the one or more data messages 650 of FIG. 6 associated with the insertion slot 690. The information included in FIG. 7 may be sent via one data message or may be sent via multiple data messages. A data message may include information in addition to information shown in FIG. 7, and/or may not include all of the information shown in FIG. 7. As shown in FIG. 7, information associated with each content item of the one or more content items (e.g., content items 660, 665, 670, and 675) planned to be inserted in the insertion slot 690 may be included in the one or more data messages 650. For convenience, FIG. 7 shows the one or more data messages 650 as a table comprising a plurality of columns 705, 710, 720, 725, and 730 and a plurality of rows 740, 745, 750, and 755, but data messages need not be in table form. Each of rows 740, 745, 750, and 755 corresponds to a content item. In particular, row 740 corresponds to the content item 660, row 745 corresponds to the content item 665, row 750 corresponds to the content item 670, and the row 755 corresponds to the content item 675. Fields in column 705 may comprise content item IDs for the content items corresponding to the rows containing those fields. Fields in column 710 may comprise flags indicating whether the content items, corresponding to rows containing those fields, are replaceable. A flag showing the corresponding content item is replaceable may be treated as a permission to replace the corresponding content item, if an indication to replace at least a portion of the content item is received during the output of that content item. Fields in column 720 may comprise values indicating times when the content items, corresponding to rows containing those fields, are scheduled to be started ("start time"). Fields in column 725 may comprise values indicating times when the content items, corresponding to rows containing those fields, are scheduled to be ended ("end time"). Fields in column 730 may comprise a value indicating time durations of the content item corresponding to rows containing those fields. One or more data messages 650 may also comprise data fields that are not shown in FIG. 7. For example, one or more data messages 650 may comprise data indicating conditions to be met before a replaceable content item is replaced. For example, the conditions may comprise a content item is replaceable after an impression credit is awarded, and/or after a predetermined amount of the content item has been output.

For example, as indicated in information associated with FIG. 7, the insertion slot 690 between time T1, 08:00:00 and time T5, 08:05:00 may comprise four content items. A content item (e.g., content item 660 of FIG. 6) with an ID number 0023 may be scheduled to start at time T1, 08:00:00, and end at time T2, 08:02:30. The time duration of the content item 660 may be 140 seconds. A content item (e.g., content item 665 of FIG. 6) with an ID number 0024 may be scheduled to start at time T2, 08:02:30, and end at time T3, 08:03:00. The time duration of the content item 665 may be 30 seconds. A content item (e.g., content item 670 of FIG. 6) with an ID number 0025 may be scheduled to start at time T3, 08:03:00, and end at time T3, 08:04:00. The time duration of the content item 670 may be 60 seconds. A content item (e.g., content item 675 of FIG. 6) with an ID number 0026 may be scheduled to start at time T4, 08:04:00, and end at time T5, 08:05:00. The time duration of the content item 675 may be 60 seconds.

FIG. 7 is merely an example. Some of the information in FIG. 7 may be implied. For example, for each content item, two of the start time, the end time, and the time duration may be included in the one or more data messages and the other may be implied. As another example, the start time (or end time) of each content item may be included in the one or more data messages, but both the end time (or the start time of the next content item) and the time duration of the content item may be implied based on each content item being output consecutively. Similarly, the start time of the content item (e.g., content item 680) following the insertion slot 690 may be expressly indicated by a data message and/or may be implied based on the end time of the last content item of the one or more content items planned to be inserted into the insertion slot 690.

The one or more data messages 650 received in step 505 may comprise modified versions of data messages conforming with the Digital Program Insertion Cueing Message for Cable (ANSI/SCTE 35, or SCTE-35) standard. For example, one or more data messages may be a splice insert command packet under SCTE-35 standard. The splice insert command under SCTE-35 may have a four bits data field that is reserved. One of the reserved bits may be assigned to indicate whether the content item is replaceable. Table 1 below shows an example of the splice insert command modified for use as a data message that may be received in step 505. Table 1 as shown below has three columns. The "syntax" column may indicate the name of each data field in the payload of a data message complying with Splice_

Insert( ) command. The "Bits" column may indicate the number of bits of each data field in the corresponding row (e.g., the number 32 corresponding to the row that has a syntax value of "slice_event-id" may indicate the "slice_event_id" data field has 32 bits). The "Mnemonic" column may indicate how the bit string in the corresponding row is to be understood (e.g., "uimsbf" may indicate the bit string in the data field indicated in the corresponding row is a "Unsigned Integer Most Significant Bit First," "bslbf" may indicate the bit string in the data field indicated in the corresponding row is a "Bit String, Left Bit First"). A replaceable_content_indicator value of 1 may indicate that this data message also comprises the start time or end time of the content item. The start time and end time may use the same bit and be distinguished by the out_of_network_indicator. For example, if the value of the out_of_network_indicator is 1, it may indicate the splice_time( ) field may indicate the start time. If the value of the out_of_network_indicator is 0, it may indicate the splice_time ( ) field may indicate the end time. The time indicated in either the start time or end time may be adjusted by pts_adjustment information in the splice_info_section as described in SCTE-35 standard.

item and may indicate that the splice_time( ) field in this data message indicates the start time of the content item associated with this data message. A segmentation_type-id value of 0x53 may indicate that the content item associated with the data message is a replaceable content item, and may indicate the splice_time( ) field in this data message indicates the end time of the content item associated with this data message. Similarly as discussed above, the time indicated in the splice_time( ) field may be adjusted by pts_adjustment information in the splice_info_section as described in SCTE-35 standard.

TABLE 2

Time signal Segmentation descriptor as modified.

| Syntax | Bits | Mnemonic |
|---|---|---|
| segmentation_descriptor( ) { | | |
|   splice_descriptor_tag | 8 | uimsbf |
|   descriptor_length | 8 | uimsbf |
|   identifier | 32 | uimsbf |
|   segmentation_event_id | 32 | uimsbf |
|   segmentation_event_cancel_indicator | 1 | bslbf |

TABLE 1

Splice_Insert( ) command as modified

| Syntax | Bits | Mnemonic |
|---|---|---|
| splice_insert( ) { | | |
|   splice_event_id | 32 | uimsbf |
|   splice_event_cancel_indicator | 1 | bslbf |
|   reserved | 7 | bslbf |
|   if(splice_event_cancel_indicator == '0') { | | |
|     out_of_network_indicator | 1 | bslbf |
|     program_splice_flag | 1 | bslbf |
|     duration_flag | 1 | bslbf |
|     splice_immediate_flag | 1 | bslbf |
|     skippable_ad_indicator | 1 | bslbf |
|     reserved | 3 | bslbf |
|     if((program_splice_flag == '1') && (splice_immediate_flag == '0')) | | |
|       splice_time( ) | | |
|     if(program_splice_flag == '0') { | | |
|       component_count | 8 | uimsbf |
|       for(i=0;i<component_count;i++) { | | |
|         component_tag | 8 | uimsbf |
|         if(splice_immediate_flag == '0') | | |
|           splice_time( ) | | |
|       } | | |
|     } | | |
|     if(duration_flag == '1') | | |
|       break_duration( ) | | |
|     unique_program_id | 16 | uimsbf |
|     avail_num | 8 | uimsbf |
|     avails_expected | 8 | uimsbf |
|   } | | |
| } | | |

For another example, one or more data messages 650 received in step 505 may be a Time Signal Command's Segmentation Descriptor under the SCTE-35 standard. Table 2 shows an example of the Time Signal Segmentation Descriptor command modified for use as a data message that may be received in step 505. Similar to Table 1, Table 2 may have three columns. The "syntax" column may indicate the name of each data field in the payload of a data message complying with Splice_Insert( ) command. The "Bits" column may indicate the number of bits of each data field in the corresponding row. The "Mnemonic" column may indicate how the bit string in the corresponding row is to be understood. For example, a segmentation_type-id value of 0x52 may indicate that the content item is a replaceable content TABLE 2-continued Time signal Segmentation descriptor as modified.

| Syntax | Bits | Mnemonic |
|---|---|---|
|   reserved | 7 | bslbf |
|   if(segmentation_event_cancel_indicator == '0') { | | |
|     program_segmentation_flag | 1 | bslbf |
|     segmentation_duration_flag | 1 | bslbf |
|     delivery_not_restricted_flag | 1 | bslbf |
|     if(delivery_not_restricted_flag == '0') { | | |
|       web_delivery_allowed_flag | 1 | bslbf |
|       no_regional_blackout_flag | 1 | bslbf |
|       archive_allowed_flag | 1 | bslbf |

TABLE 2-continued

Time signal Segmentation descriptor as modified.

| Syntax | Bits | Mnemonic |
|---|---|---|
|     device_restrictions | 2 | bslbf |
|   } else { | | |
|     reserved | 5 | bslbf |
|   } | | |
|   if(program_segmentation_flag == '0') { | | |
|     component_count | 8 | uimsbf |
|     for(i=0;i<component_count;i++) { | | |
|       component_tag | 8 | uimsbf |
|       reserved | 7 | bslbf |
|       pts_offset | 33 | uimsbf |
|     } | | |
|   } | | |
|   if(segmentation_duration_flag == '1') | | |
|     segmentation_duration | 40 | uimsbf |
|   segmentation_upid_type | 8 | uimsbf |
|   segmentation_upid_length | 8 | uimsbf |
|   segmentation_upid( ) | | |
|   segmentation_type_id | 8 | uimsbf |
|   segment_num | 8 | uimsbf |
|   segments_expected | 8 | uimsbf |
|   if(segmentation_type_id == '0X34' || | | |
|     segmentation_type_id == '0X36') { | | |
|     sub_segment_num | 8 | uimsbf |
|     sub_segments_expected | 8 | uimsbf |
|   } | | |
| } | | |
| } | | |

Referring back to FIG. 5A, in step 510, the user device 305 may read the one or more data messages 650 received in step 505 and determine whether at least one of the one or more content items planned to be inserted in the upcoming insertion slot 690 is replaceable. For example, based on the one or more data messages comprising information shown in row 740 of FIG. 7, the user device 305 may determine that content item 660 is replaceable. Similarly, based on information shown in rows 745, 750, and 755 respectively, the user device 305 may determine that the content item 665 is replaceable, the content item 670 is not replaceable, and the content item 675 is replaceable. If at least one of the one or more content items planned to be inserted into the upcoming insertion slot 690 is replaceable, step 515 may be performed. If no content item of the one or more content items planned to be inserted into the insertion slot 690 is replaceable, step 520 may be performed.

In step 515, a plurality of candidate content items may be obtained. For example, the user device 305 may obtain the plurality of candidate content items from the alternate content server 325 (e.g., by retrieving either the plurality of content items or by retrieving a playlist comprising addresses associated with the plurality of content items). The plurality of candidate content items may be determined based on a policy profile. For example, the policy profile may either be received from a server (e.g., alternate content server 325) or be generated by instructions from the user, or generated by a combination of server instructions and user instructions. For example, the policy profile may indicate the priorities of the plurality of content items based on a variety of factors (e.g., geographical locations, current time, demographical information associated with the time or location, the content item that is currently being output). The policy profile may also be edited by the user (e.g., the user may select what types of content items the user may be interested/ not interested to view). A user may select a preference and/or interest expressly (e.g., by input on a selection menu) or implicitly. For example, implicit preference input may be made through indications to replace certain content items. For example, if the user replaces automobile advertisements multiple times, the policy file may be edited to rate automobile advertisements to a lower priority.

The plurality of content items may also have different time durations. For example, one content item may have a time duration of 10 seconds, while another content item may have a time duration of 10 minutes. That may be helpful to allow flexibility to select the alternate content item that may fit the time period as needed.

In step 520, a determination may be made as to whether it is the time to start outputting a certain content item (e.g., the first content item, planned to be inserted into the insertion slot 690, that is replaceable) associated with one or more data messages received in step 505. For example, consistent with FIG. 6 and FIG. 7, at time T1, 08:00:00, it may be determined that the content item 660 is scheduled to be started. If the time arrives, step 525 may be performed. If the time has not arrived yet, other content items (e.g., the content item 655) may be output. For example, the content item 655 may be output from time 07:30:00 to 08:00:00.

In step 525, the user device 305 may cause the content item scheduled to be output at the current time (hereinafter "the current content item") to be output via the display device 306. The user device 305 may receive a data stream associated with the current content item, decode and reformat the data stream into a format that may be understandable by the display device 306, and send the reformatted data and instruction to the display device 306 to output the current content item. The current content item may be linear (e.g., sent by the content server in a way similar to the linear content item is sent in real-time), or the current content item may be non-linear (e.g., the one or more data messages may also indicate an address for the user device 305 to obtain the current content item from a server (e.g., content server 310, alternate content server 325 or other servers) in advance and output during the scheduled time period).

In step 530, the user device 305 may determine whether an indication to replace the current content item being output is received. The indication may be sent from a user (e.g., via a user input device 315). The user may send the indication in a variety of ways. For example, the user may press a skip button that triggers the user input device 315 to send the indication to replace the current content item. For another example, if the current content item is allowed to be fast-forwarded, the fact that the current content item has been fast-forwarded to the end, or the fact that the current content item has been fast-forwarded for an amount of time exceeding a threshold (e.g., 20% of the current content item has been fast-forwarded), may be treated as the indication to replace the current content item. For another example, the indication may be inferred by a user's action. For example, the user input device 315 may comprise a camera, and if the camera detects the user has been looking somewhere else for an amount of time exceeding a threshold, it may be determined an indication to replace the current content item has been made. For another example, the indication may be inferred by the user's previous replacement indications for similar content. For example, if the user frequently replaces scenes that are violent, an indication to replace the current content item may be inferred if it is determined that some portions of the current content item comprise violent content. If no such indication is received, step 535 may be performed.

In step 535, the user device 305 may determine whether the time to end the output of the current content item has arrived. For example, the determination may be made based on the one or more data messages 650 received at step 505. Consistent with the example in FIG. 7, if the current content item is content item 660 (with a content ID of 0023), the time to end the output of the current content item may be T2, 08:02:30. If the time to end has arrived, the step 585 in FIG. 5B may be performed. If the time has not arrived, step 525 may be performed by keeping causing the current content item to continue to be output.

Referring to FIG. 5B, in step 585, the user device 305 may determine whether it is the time the insertion slot 690 ends. The user device 305 may determine a time that the insertion slot 690 is scheduled to end based on a variety of information (e.g., based on data messages indicating the start time of a content item 680 following the insertion slot 690, the end time of the last content item 675 of the one or more content items planned to be inserted in the insertion slot 690, or a time expressly indicating the time when the insertion slot 690 ends). If it is the time the insertion slot 690 ends, step 590 may be performed. In step 590, the user device 305 may cause the output of a content item following the insertion slot 690 (e.g., content item 680 immediately following the insertion slot 690). If the insertion slot 690 has not ended, step 525 may be performed and the next content item scheduled for the insertion slot 690 may be treated as the current content item. In step 525, as discussed above, the user device 305 may cause the output of the next scheduled content item for the insertion slot 690, which becomes the current content item. Referring back to step 530, if the indication to replace the current content item is received, step 545 may be performed. In step 545, a determination may be made as to whether the current content item is replaceable. The determination may be based on the one or more data messages associated with the current content item. Consistent with the example as shown in FIG. 6 and FIG. 7, if the current content item is content item 660 (e.g., content item with an ID number of 0023), the user device 305 may determine that the current content item is replaceable based on information in row 740 of FIG. 7. Similarly, if the current content item is content item 670 (e.g., content item with an ID number of 0025), the user device 305 may determine that the current content item is not replaceable based on information in row 750 of FIG. 7.

If it is determined that the current content item is not replaceable, step 550 may be performed. In step 550, a notice may be displayed to the user to inform the user that the current content item is not replaceable, and step 535 may be performed to keep causing the current content item to be output. If it is determined that the current content item is replaceable, step 555 may be performed.

Referring to FIG. 5B, in step 555, the user device 305 may determine the next non-replaceable content item, and the time when the next non-replaceable content item is scheduled to be started. This time may be used as a time when the alternate content items selected as discussed below are to be ended. The user device 305 may also determine if there are any replaceable content items between the current time and the start of the next non-replaceable content item. If there are any such replaceable content items, the user device 305 may also determine the start and/or end time of each of the replaceable content items.

For example, consistent with the example in FIGS. 6 to 7, if the current content item is content item 660 (content item with an ID number of 0023), the next content item may be content item 665 (content item with an ID number of 0024). The user device 305 may determine that the next content item 665 is replaceable based on one or more data messages associated with the next content item 665 (e.g., the one or more data messages may indicate information as illustrated in row 745 in FIG. 7). The user device 305 may determine that the next unreplaceable content item is content item 670 (content item with an ID number 0025), based on information in row 750 of FIG. 7.

In another example, if the current content item is content item 675 (content item with an ID number of 0026), the next unreplaceable content item may be content item 680 scheduled to be output at a time outside the insertion slot 690. The user device 305 may determine the content item 680 is the next unreplaceable content item. The determination may be made based on data messages associated with content item 680 (not shown in FIGS. 6 to 7). Also or alternatively, information about the content 680 may be included in the one or more data messages 650.

In step 559, an exit frame of the current content item may be determined similar to as described in connection with FIGS. 4A to 4E. The output of the current content item may be interrupted after the exit frame is output (e.g., time T0 as shown in FIG. 6).

In step 560, the user device 305 may determine one or more times between the current time and the time to start the output of the next non-replaceable content item. Consistent with the examples discussed above, if the current content item is content item 660, the next non-replaceable content item is content item 670, and the indication to replace the current content item 660 is received at a time on or before time T0 as shown in FIG. 6, the one or more times may comprise at least the following times. The one or more times between current time and the time to start the output of the next non-replaceable content item may comprise at least one of time T0 when the output of the current content item 660 is to be interrupted, time T2 when the next replaceable content item 665 is scheduled to be started, or time T3 when the next non-replaceable content item 670 is scheduled to be started. FIG. 6 is only an illustrative example. The insertion slots 690 may comprise any number of content items. For example, one or more content items may be included prior to content item 660, in between of any two consecutive content items as shown the insertion slot 690 in FIG. 6, or after content item 675. The one or more times may also comprise the time that each of the replaceable content items is scheduled to be started.

A determination may be made (e.g., as part of step 560) whether the current content item is only replaceable after a predetermined condition. If the current content item is replaceable after one or more conditions have been met (e.g., after an impression credit has been met), additional steps that determine whether the condition(s) have been met may be added to the algorithm described in connection with FIGS. 5A to 5B. For example, if an impression credit is to be awarded before the current content item 660 becomes replaceable, the user device 305 may, after the indication to replace the current content item 660 is received, determine whether an impression credit has been awarded. If it is determined that an impression credit has not been awarded, the user device 305 may determine the time T0 to interrupt the current content item based on additional time period needed before the impression credit is to be awarded (e.g., as discussed above, if an additional 20 seconds is needed before the impression credit is awarded, the user device 305 may determine the time T0 to interrupt the current content item 660 as a time at 20 seconds later than the current time). Also or alternatively, if no impression credit has been awarded, the user device 305 may discard the indication to replace the current content item 660 and cause the display of a message to the user. The message may indicate the additional time period needed before the user is allowed to replace the current content item 660. The user device 305 may continue the output of the current content item 660 before the impression credit is awarded.

In step 565, one or more alternate content items to replace the current content item may be selected. As discussed above in connection with FIG. 4C and similar to the selection of content item 460 from the plurality of content items 450, the selection may be based on the time duration of each of the plurality of candidate content items, and the time duration of potential time periods that may be used to insert one or more alternate content items. For example, consistent with the example illustrated in FIG. 6, the user device 305 may determine a time period 694 is between time T0 and time T2 and may have a time duration of D1. The time period 694 may be determined based on the end time of content item 660. As discussed above, time T0 may be a time when the current content item 660 is to be interrupted, and time T2 may be a time when the current content item 660 is scheduled to be ended. One or more alternate content items having a total time duration of D1 may be selected and used to replace the remaining portion of the current content item 660. Other criteria (e.g., as discussed in connection with FIG. 4C) may be used. Alternatively, the user device 305 may determine, based on a determination that the next content item 665 is also replaceable, a time period 692 is between time T0 and time T3 and may have a time duration of D2. As discussed above, time T3 may be a time when the next content item 665 is scheduled to end. One or more alternate content items having a total time duration of D2 may be selected and used to be inserted in the time period 692 to replace both the remaining portion of the current content item 660 and the next content item 665. Similarly, other criteria (e.g., as discussed in connection with FIG. 4C) may be used. If the time period 692 is selected to insert the one or more alternate content items, the user device 305 may determine to skip the content item 665. The determination of whether to insert alternate content items during time period 694 or during time period 692 (e.g., whether to replace some or all of multiple replaceable content items scheduled before the next unreplaceable content item) may be performed in a variety of ways. For example, the user device 305 may make the determination based on a comparison between one or more first candidate alternate content items to be inserted into time period 694 and one or more second candidate alternate content items to be inserted into time period 692 (e.g., based on user preferences of the types of the content items, storage locations of each of the candidate alternate content items, etc.). Also or alternatively, the user device 305 may cause the output of a message to the user to ask the user to decide whether the user wants to replace the content item 665 as well, and select the proper time period based on the user's input response.

In step 570, the output of the current content item may be interrupted. As discussed in connection with FIGS. 4A to 4D above, the output of the current content item may be interrupted at a time based on either a scheduled output time of a proper exit frame and/or other factors (e.g., the time when an impression credit of the current content item is to be awarded). In step 575, the user device 305 may cause the output of the selected one or more alternate content items to be output via a display device 306. If the output of the one or more alternate content items occupies the time to output one or more following replaceable content items, the one or more following replaceable content items may be skipped. For example, if the total time duration of the one or more alternate content items is substantially similar to the time duration of D2 as shown in FIG. 6, the content item 665 following the current content item 660 may be skipped.

In step 580, a determination may be made as to whether the time to start the next initially-scheduled content item that is not skipped or the time to end the one or more alternate content items has arrived, whichever comes first. For example, consistent with FIG. 6, the next initially-scheduled content item may be the content item 665 if the one or more alternate content items have a total time duration of D1 and are inserted into the time period 694, or may be the content item 670 if the one or more alternate content items have a total time duration of D2 and are inserted into the time period 692 (as the content item 665 may have been skipped). As discussed above, the total time duration of the one or more alternate content items may be equal to, longer than, or shorter than the time duration between the time when the previous content item is interrupted and the time when the next initially-scheduled content item is scheduled to start (e.g., time duration D1 or time duration D2 as illustrated in FIG. 6). If the time to start the next initially-scheduled content item arrives at the same time as the time to end the one or more alternate content items, and the next initially-scheduled content item may start after the one or more alternate content items end. If the one or more alternate content items end before the next initially-scheduled content item starts (e.g., 2 seconds before the next initially-scheduled content item starts), other content such as a still picture may be displayed. If the next initially-scheduled content item starts before the one or more alternate content items end, the output of the one or more alternate content items may be interrupted so that the next initially-scheduled content item may be started on time.

As discussed above, in step 585, the user device 305 may determine whether the insertion slot 690 ends. If the insertion slot 690 ends, the user device may cause the output of content items (e.g., content item 680) outside the insertion slot 690. If the insertion slot 690 has not ended, step 525 may be performed and the next initially-scheduled content item treated as the current content item. In step 525, as discussed above, the user device 305 may cause the output of the current content item that is scheduled to be output at that time.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device, a first indication to skip at least a portion of a first content item being output via a display device;
   selecting, based on a second indication indicating that the first content item is replaceable, one or more subsequent content items for replacement;
   determining a remaining duration, of the first content item, that starts at a time associated with an exit frame that precedes one of:
   an intra-coded picture frame of the first content item,
   an instantaneous decoder refresh frame of the first content item, or
   a predicted picture frame of the first content item;

selecting, based on a time period comprising a duration of the one or more subsequent content items and the remaining duration of the first content item, an alternate content item; and causing output of at least a portion of the selected alternate content item.

2. The method of claim 1, wherein the determining comprises determining the exit frame based on the first indication.

3. The method of claim 1, wherein the method further comprises:

receiving, before output of the first content item via the display device, a data message comprising the second indication and at least one of: a first timestamp corresponding to a time when the first content item is scheduled to start, a second timestamp corresponding to a time when the first content item is scheduled to end, or a time duration of the first content item.

4. The method of claim 1, wherein at least one of the first content item or the selected alternate content item comprises an advertisement.

5. The method of claim 1, further comprising determining a linear content item is to be output via the display device, wherein the one or more subsequent content items are scheduled to be output before the linear content item.

6. The method of claim 1, wherein the selecting the alternate content item comprises:

determining a plurality of alternate content items, wherein at least two of the plurality of alternate content items have different time durations; and selecting, from the plurality of alternate content items and based on comparisons of the different time durations and a duration of the time period, the alternate content item.

7. The method of claim 1, wherein the selecting the alternate content item comprises:

determining a plurality of versions of the alternate content item, wherein each version of the plurality of versions has a different time duration; and selecting, from the plurality of versions and based on comparisons of the different time durations and a duration of the time period, a first version.

8. The method of claim 1, wherein the second indication indicates that the first content item is replaceable after an impression credit has been awarded; and wherein the method further comprises:

determining, based on the second indication, the first indication, and a determination that no impression credit has been awarded, to continue output of the first content item, via the display device and for an additional time period, before the output of the at least the portion of the selected alternate content item.

9. The method of claim 1, further comprising:

determining that a duration of the alternate content item exceeds a duration of the time period; and causing, based on the duration of the alternate content item exceeding the duration of the time period, omission of an end portion of the alternate content item.

10. The method of claim 1, further comprising:

determining that a duration of the alternate content item is less than a duration of the time period; and causing, based on the duration of the alternate content item being less than the duration of the time period, an image to be output after the alternate content item ends.

11. The method of claim 1, wherein the one or more subsequent content items consists of a second content item scheduled for output immediately following the first content item.

12. The method of claim 1, wherein the one or more subsequent content items comprises:

a second content item scheduled for output immediately following the first content item, and a third content item scheduled for output immediately following the second content item.

13. The method of claim 1, wherein the selecting the one or more subsequent content items for replacement is based on the duration of the one or more subsequent content items.

14. The method of claim 1, wherein the exit frame precedes, in decode order, one of:

an intra-coded picture frame of the first content item, an instantaneous decoder refresh frame of the first content item, or a predicted picture frame of the first content item.

15. The method of claim 3, wherein the data message comprises an SCTE-35 packet.

16. A method comprising:

receiving, by a first computing device from a second computing device and via a network, a first indication to skip at least a portion of a first content item being output via the second computing device;

selecting, based on a second indication indicating that the first content item is replaceable, one or more subsequent content items for replacement;

determining a remaining duration, of the first content item, that starts at a time associated with an exit frame that precedes one of:

an intra-coded picture frame of the first content item, an instantaneous decoder refresh frame of the first content item, or a predicted picture frame of the first content item;

selecting, based on a time period comprising a duration of the one or more subsequent content items and the remaining duration of the first content item, an alternate content item; and sending, to the second computing device, information identifying the alternate content item.

17. The method of claim 16, wherein the determining comprises determining the exit frame based on the first indication.

18. The method of claim 16, wherein the selecting the alternate content item comprises:

determining a plurality of alternate content items comprising the alternate content item, wherein at least two of the plurality of alternate content items have different time durations; and selecting, from the plurality of alternate content items and based on comparisons of the different time durations and a duration of the time period, the alternate content item.

19. The method of claim 16, wherein the selecting the alternate content item comprises:

determining a plurality of versions of the alternate content item, wherein each version of the plurality of versions has a different time duration; and selecting, from the plurality of versions and based on comparisons of the different time durations and a duration of the time period, a first version.

20. A computing device comprising:

one or more processors; and memory storing instructions that, when executed by the one or more processors, cause the computing device to:

receive a first indication to skip at least a portion of a first content item being output via a display device;

select, based on a second indication indicating that the first content item is replaceable, one or more subsequent content items for replacement;

determine a remaining duration, of the first content item, that starts at a time associated with an exit frame that precedes one of:
- an intra-coded picture frame of the first content item,
- an instantaneous decoder refresh frame of the first content item, or
- a predicted picture frame of the first content item;

select, based on a time period comprising a duration of the one or more subsequent content items and the remaining duration of the first content item, an alternate content item; and cause output of at least a portion of the selected alternate content item.

21. The computing device of claim 20, wherein the instructions, when executed by the one or more processors, further cause the computing device to determine the remaining duration by causing the computing device to determine the exit frame based on the first indication.

22. The computing device of claim 20, wherein the instructions, when executed by the one or more processors, further cause the computing device to:
receive, before output of the first content item via the display device, a data message comprising the second indication and at least one of: a first timestamp corresponding to a time when the first content item is scheduled to start, a second timestamp corresponding to a time when the first content item is scheduled to end, or a time duration of the first content item.

23. The computing device of claim 20, wherein at least one of the first content item or the selected alternate content item comprises an advertisement.

24. One or more non-transitory computer-readable media storing instructions that, when executed, cause:
receiving, by a computing device, a first indication to skip at least a portion of a first content item being output via a display device;

selecting, based on a second indication indicating that the first content item is replaceable, one or more subsequent content items for replacement;

determining a remaining duration, of the first content item, that starts at a time associated with an exit frame that precedes one of:
- an intra-coded picture frame of the first content item,
- an instantaneous decoder refresh frame of the first content item, or
- a predicted picture frame of the first content item;

selecting, based on a time period comprising a duration of the one or more subsequent content items and the remaining duration of the first content item, an alternate content item; and causing output of at least a portion of the selected alternate content item.

25. The one or more non-transitory computer-readable media of claim 24, wherein the instructions, when executed, cause the determining by causing determining the exit frame based on the first indication.

26. The one or more non-transitory computer-readable media of claim 24, wherein the instructions, when executed, further cause:
receiving, before output of the first content item via the display device, a data message comprising the second indication and at least one of: a first timestamp corresponding to a time when the first content item is scheduled to start, a second timestamp corresponding to a time when the first content item is scheduled to end, or a time duration of the first content item.

27. The one or more non-transitory computer-readable media of claim 24, wherein at least one of the first content item or the selected alternate content item comprises an advertisement.

28. A first computing device comprising:
one or more processors; and
memory storing instructions that, when executed by the one or more processors, cause the first computing device to
receive, from a second computing device and via a network, a first indication to skip at least a portion of a first content item being output via the second computing device;

select, based on a second indication indicating that the first content item is replaceable, one or more subsequent content items for replacement;

determine a remaining duration, of the first content item, that starts at a time associated with an exit frame that precedes one of:
- an intra-coded picture frame of the first content item,
- an instantaneous decoder refresh frame of the first content item, or
- a predicted picture frame of the first content item;

select, based on a time period comprising a duration of the one or more subsequent content items and the remaining duration of the first content item, an alternate content item; and send, to the second computing device, information identifying the alternate content item.

29. The first computing device of claim 28, wherein the instructions, when executed, cause the first computing device to determine the remaining duration by determining the exit frame based on the first indication.

30. The first computing device of claim 28, wherein the instructions, when executed, cause the computing device to select the alternate content item by causing the first computing device to:
determine a plurality of alternate content items comprising the alternate content item, wherein at least two of the plurality of alternate content items have different time durations; and select, from the plurality of alternate content items and based on comparisons of the different time durations and a duration of the time period, the alternate content item.

31. The first computing device of claim 28, wherein the instructions, when executed, cause the computing device to select the alternate content item by causing the first computing device to:
determine a plurality of versions of the alternate content item, wherein each version of the plurality of versions has a different time duration; and select, from the plurality of versions and based on comparisons of the different time durations and a duration of the time period, a first version.

32. One or more non-transitory computer-readable media storing instructions that, when executed, cause:
receiving, by a first computing device from a second computing device and via a network, a first indication to skip at least a portion of a first content item being output via the second computing device;

selecting, based on a second indication indicating that the first content item is replaceable, one or more subsequent content items for replacement;

determining a remaining duration, of the first content item, that starts at a time associated with an exit frame that precedes one of:
- an intra-coded picture frame of the first content item,
- an instantaneous decoder refresh frame of the first content item, or
- a predicted picture frame of the first content item;

selecting, based on a time period comprising a duration of the one or more subsequent content items and the remaining duration of the first content item, an alternate content item; and sending, to the second computing device, information identifying the alternate content item.

33. The one or more non-transitory computer-readable media of claim 32, wherein the instructions, when executed, cause the determining by causing determining the exit frame based on the first indication.

34. The one or more non-transitory computer-readable media of claim 32, wherein the instructions, when executed, cause the selecting the alternate content item by causing:
determining a plurality of alternate content items comprising the alternate content item, wherein at least two of the plurality of alternate content items have different time durations; and
selecting, from the plurality of alternate content items and based on comparisons of the different time durations and a duration of the time period, the alternate content item.

35. The one or more non-transitory computer-readable media of claim 32, wherein the instructions, when executed, cause the selecting the alternate content item by causing:
determining a plurality of versions of the alternate content item, wherein each version of the plurality of versions has a different time duration; and
selecting, from the plurality of versions and based on comparisons of the different time durations and a duration of the time period, a first version.

* * * * *